United States Patent [19]

Agano

[11] Patent Number: 5,097,342
[45] Date of Patent: Mar. 17, 1992

[54] IMAGE RECORDING APPARATUS WITH CORRECTION OF RECORDING SIGNAL FOR VARIATIONS IN APPARATUS FUNCTION AND FILM CHARACTERISTICS

[75] Inventor: Toshitaka Agano, Kanagawa, Japan

[73] Assignee: Fuji Photo Film Co., Ltd., Kanagawa, Japan

[21] Appl. No.: 511,136

[22] Filed: Apr. 19, 1990

[30] Foreign Application Priority Data

Apr. 20, 1989 [JP] Japan .................................. 1-101068

[51] Int. Cl.$^5$ ............................................. H04N 1/23
[52] U.S. Cl. ..................................... 358/302; 346/108
[58] Field of Search ............... 358/296, 298, 302, 443, 358/445, 447, 448, 300, 174; 340/736; 346/107 R, 108, 160; 315/367, 370

[56] References Cited

U.S. PATENT DOCUMENTS 4,472,707  9/1984  Wilensky .............................. 340/736

Primary Examiner—Benjamin R. Fuller
Assistant Examiner—Scott A. Rogers
Attorney, Agent, or Firm—Sughrue, Mion, Zinn, Macpeak & Seas

[57] ABSTRACT

An image recording apparatus for recording an image on an image recording medium includes a digital-to-analog converter for converting digital image data into analog image data, and a multiplier for multiplying the analog image data from the digital-to-analog converter by a signal for correcting for variations in the image recording apparatus. The density of gradations of the image to be recorded is controlled with an output signal from the multiplier. The resolution of the digital-to-analog converter ranges from 8 to 12 bits. The apparatus comprises a multiplying digital-to-analog converter, and the signal for correcting for variations is represented by digital data.

6 Claims, 2 Drawing Sheets in

IMAGE RECORDING APPARATUS WITH CORRECTION OF RECORDING SIGNAL FOR VARIATIONS IN APPARATUS FUNCTION AND FILM CHARACTERISTICS

BACKGROUND OF THE INVENTION

The present invention relates to an image recording apparatus, and more particularly to an image recording apparatus which expose a photographic film or the like to a light beam to record a highly defined image on the film in a predetermined range of image densities.

There have recently been developed radiation image recording and reproducing systems for producing he radiation image of an object using a stimulable phosphor material capable of emitting light upon exposure to stimulating rays (see, for example, Japanese Laid-Open Patent Publications Nos. 55-12429, 55-103472, 55-116340, 55-87970, etc). These radiation image recording and reproducing systems are finding wider use particularly in the medical field. When a certain phosphor is exposed to a radiation such as X-rays, α-rays, β-rays, γ-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned wit stimulating rays such as a laser beam, so that the stimulable phosphor sheet emits light representative of the radiation image. The emitted light is then photoelectrically detected to produce an analog image signal which is then converted into a digital image signal representing digital image data. The digital image signal is thereafter electrically processed and converted again into an analog image signal. The analog image signal is used to modulate a laser beam, which is applied to a recording medium such as a photographic photosensitive material to record the image thereon. The recorded image is finally developed into a visible image.

It is known that if an image to be reproduced by the radiation image recording and reproducing system is a continuous-tone image, then it is expressed in a range of about 1,000 tones, or stated otherwise, the digital data of the image can be represented by 10 bits. Therefore, the digital-to-analog (D/A) converter, which is used to convert the digital image signal back into the analog image signal in the radiation image recording and reproducing system, may have a 12-bit resolution as long as its function of reproducing gradations is concerned.

However, the radiation image recording and reproducing system is actually required to correct images in view of film sensitivity characteristics, automatic developing machine characteristics, optical system transmittance characteristics, and laser power fluctuations. To allow for such image corrections, the D/A converter in the system should actually have a higher resolution of 14 through 16 bits.

Since high-resolution D/A converters have a long settling time, the time required for the system to process images is very long, and the number of images which can be processed by the system (or a cycle time) is limited. The 14- through 16-bit D/A converters are highly expensive, and as a result the radiation image recording and reproducing system which uses such a D/A converter is also costly to manufacture.

SUMMARY OF THE INVENTION

It is a primary object of the present invention to provide an image recording apparatus for recording a continuous-tone image on an image recording medium such as a photographic film, the image recording apparatus having a D/A converter for converting a digital image signal into an analog image signal with image tones or gradations, and a processor separate from the D/A converter for correcting for laser power fluctuations or other variations, so that high-quality images can be reproduced without use of a high-resolution D/A converter.

Another object of the present invention is to provide an image recording apparatus comprising a digital-to-analog converter for converting digital image data into analog image data, the digital-to-analog converter having a resolution corresponding to a predetermined range of image gradations, a multiplier for multiplying the analog image data from the digital-to-analog converter by a signal for correcting for variations in the image recording apparatus, and means for controlling the density of gradations of an image to be recorded, with an output signal from the multiplier.

Still another object of the present invention is to provide the image recording apparatus wherein the resolution of the digital-to-analog converter ranges from 8 to 12 bits.

Yet another object of the present invention is to provide the image recording apparatus wherein the multiplier comprises a multiplying digital-to-analog converter, the signal for correcting for variations being represented by digital data.

A further object of the present invention is to provide the image recording apparatus further comprising laser beam generating means for generating a laser beam, light modulating means for modulating the intensity of the laser beam with the output signal from the multiplier, a light deflector for deflecting the modulated laser beam to scan a photographic film with the deflected laser beam, and an image developing machine for developing the image which is recorded on the photographic film by the deflected laser beam.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
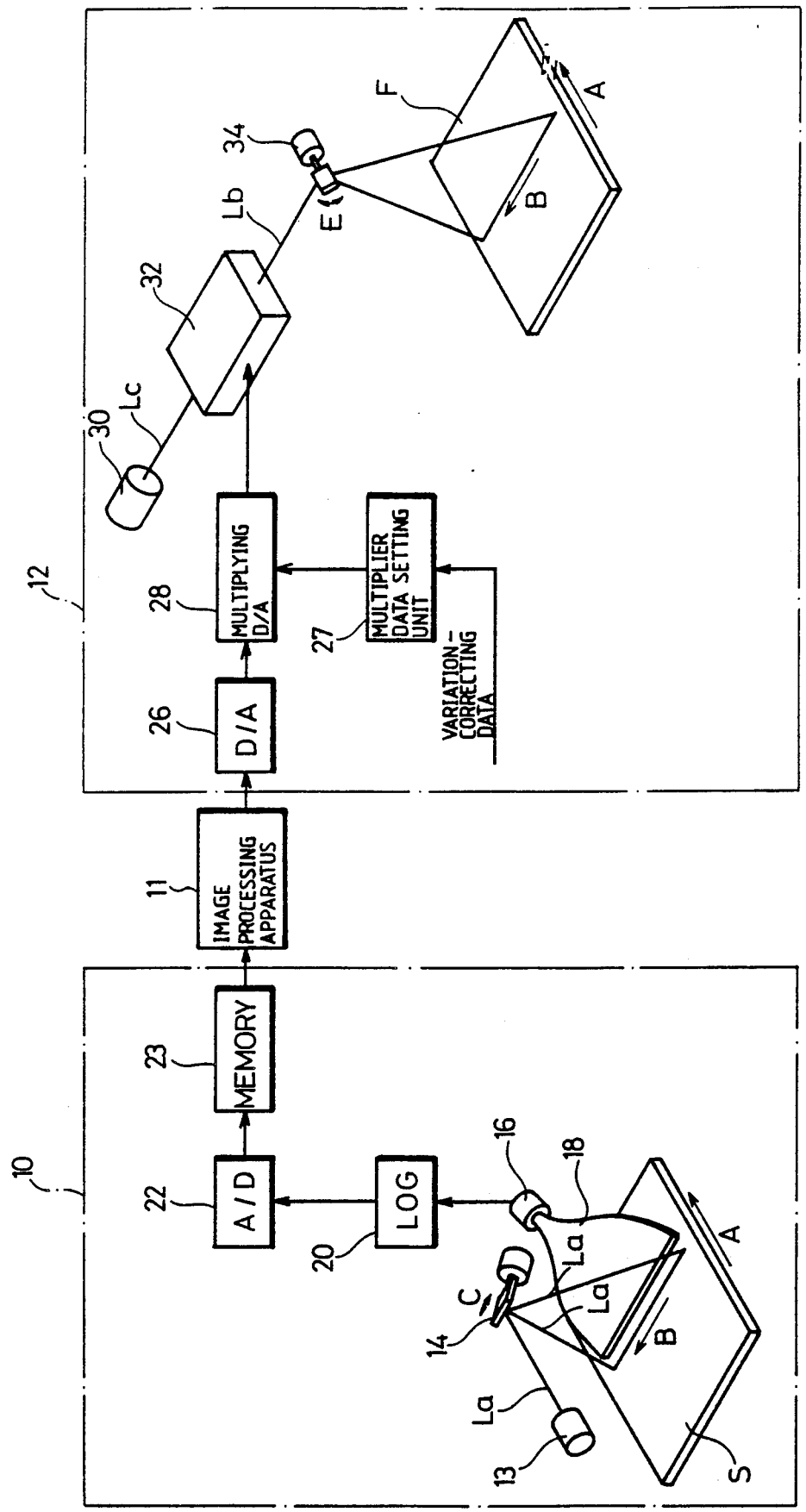
FIG. 1 is a schematic view, partly in block form, of an image reproducing system incorporating an image recording apparatus according to the present invention.

FIG. 1 schematically shows an image reproducing system in which an image recording apparatus according to the present invention is incorporated.

The image reproducing system basically comprises an image reading apparatus 10, an image processing apparatus 11, and an image recording apparatus 12. The image reading apparatus 10 includes a laser oscillator tube 13 for emitting a laser beam La to scan a stimuable phosphor sheet S, on which image information is recorded, in the main scanning direction indicated by the arrow B while the stimuable phosphor sheet S is being fed in the auxiliary scanning direction indicated by the arrow A. The image reading apparatus 10 also includes a light defector 14 such as a galvanometer mirror 14 for deflecting the laser beam La, and a light guide 18 for guiding light emitted from the stimulable phosphor sheet S toward the light-detecting surface of a photomultiplier 16. The image reading apparatus 10 further includes a logarithmic amplifier 20 for producing an output signal which represents the logarithmic function of a photoelectricaly converted signal that is applied from the photomultiplier 16 to the logarithmic amplifier 20, an analog-to-digital (A/D) converter 22 for converting an analog output signal from the logarithmic amplifier 20 into a digital image signal indicative of digital image data, and a memory 23 for storing output digital image data from the A/D converter 22.

The image processing apparatus 11 processes the digital image data from the memory 23 for gradation conversion, frequency conversion, or the like.

The image recording apparatus 12 has a 12-bit digital-to-analog (D/A) converter 26 for converting the processed digital image data from the image processing apparatus 11 into an analog image signal, and an 8-bit multiplying D/A converter 28 for multiplying the analog image signal from the D/A converter 26 by digital data from a multiplier data setting unit 27. The image recording apparatus 12 also includes an acoustooptic light modulator 32 for modulating the intensity of a laser beam Lc emitted from a laser oscillator tube 30 with an output signal from the multiplying D/A converter 28, and a light deflector 34 such as a galvanometer mirror 34 for deflecting a modulated laser beam Lb from the light modulator 32 so as to scan an image recording medium such as a photographic film F in the main scanning direction indicated by the arrow B, while the photographic film F is being fed in the auxiliary scanning direction indicated by the arrow A. The multiplier data setting unit 27 is supplied with variation-correcting data which corrects for fluctuations in the laser power produced by the laser oscillator tube 30, variations in the transmittance of the optical system which is composed of the laser oscillator tube 30 and the light modulator 32, variations in the sensitivity of photographic films F used, and variations in the gradations or tones generated by an automatic image developing machine (not shown). Such fluctuations and variations will hereinafter be referred to as "variations", and the data for correcting such variations will be referred to as "variation-correcting data". The light deflector 34 may be a polygonal mirror rather than the illustrated galvanometer mirror.

The image reproducing system incorporating the image recording apparatus according to the present invention is essentially constructed as described above.

Operation and advantages of the image reproducing system will hereinafter be described below.

The variation-correcting data, which are established by the multiplier data setting unit 27 and supplied to the multiplying D/A converter 28, will first be described.

Figure 2B:
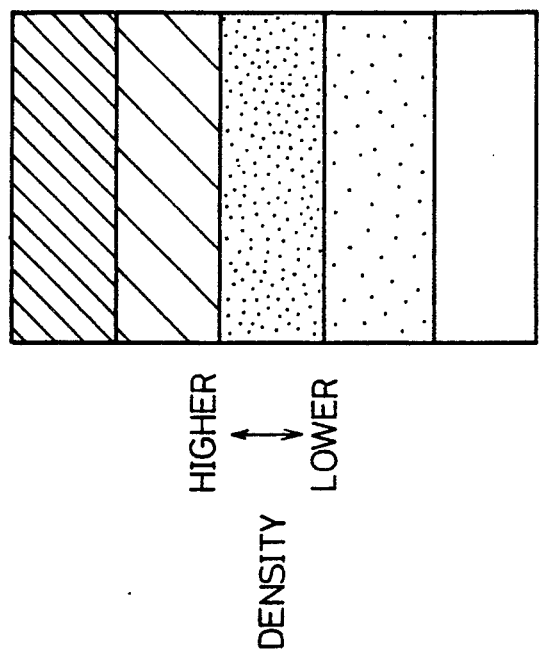
FIGS. 2(a) and 2(b) are diagrams illustrative of the manner in which to obtain variation-correcting data to be established by a multiplier data setting unit in the image reproducing system shown in FIG. 1.
Figure 2A:
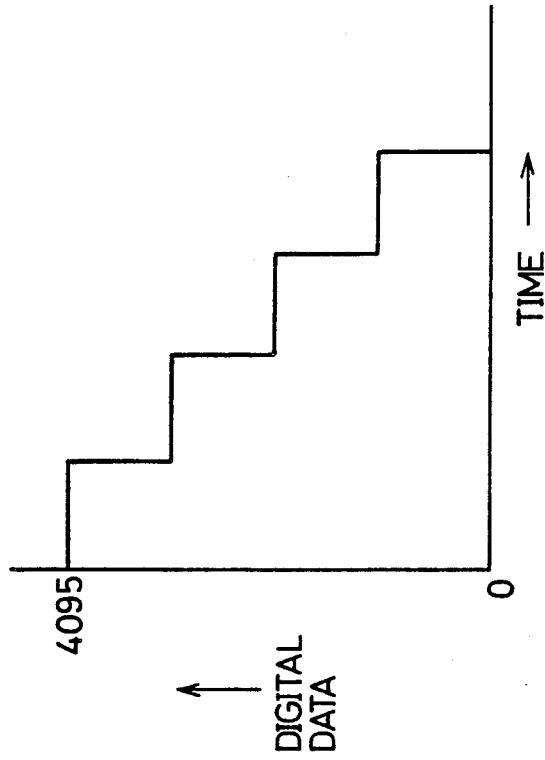

Given data Do, e.g., $2^8/2 = 128$, are supplied from a microcomputer (not shown) to the multiplier data setting unit 27. Staircase digital data corresponding to image gradations or tones in a tone range from 0 to 4095 as shown in FIG. 2(a) are supplied to the digital input terminal of the D/A converter 26.

The staircase digital data are converted into an analog voltage signal by the D/A converter 26. The analog voltage signal is then multiplied by the given data $Do = 128$ by the multiplying D/A converter 28, and the multiplied analog voltage signal is thereafter applied to the control input terminal of the light modulator 32.

The laser beam Lc emitted from the laser oscillator tube 30 is modulated in intensity with the analog voltage signal applied to the control input terminal of the light modulator 32. The modulated laser beam Lb, which is emitted from the light modulator 32, is deflected in the direction indicated by the arrow E by the galvanometer mirror 34, and scans the photographic film F in the main scanning direction indicated by the arrow B, thereby recording an image on the film F. The film F is thereafter sent to the automatic image developing machine (not shown), in which the recorded image is developed into a visible image. The visible image appears as a gray scale, as shown in FIG. 2(b), with its staircase gradations or tones corresponding to the staircase digital data shown in FIG. 2(a).

The density of the gradations or tones of the gray scale is measured by a densitometer. The data supplied to the multiplier data setting unit 27 are then varied so that the measured density falls within a predetermined range of gradation or tone densities. The data which are produced when the measured gradation density of the gray scale fall within the predetermined range are established as variation-correcting data in the multiplier data setting unit 27.

The variation-correcting data thus established are effective in compensating for fluctuations in the laser power produced by the laser oscillator tube 30, variations in the transmittance of the optical system which is composed of the laser oscillator tube 30 and the light modulator 32, variations in the sensitivity of photographic films F used, and variations in the gradations or tones generated by the automatic image developing machine.

Then, an image which is recorded on a stimulable phosphor sheet S is read by the image reading apparatus 10. More specifically, the laser beam La emitted from the laser oscillator tube 13 is applied to and reflected and deflected by the galvanometer mirror 14 which quickly swings back and forth in the direction indicated by the arrow C. The deflected laser beam La is applied to and scans the stimulable phosphor sheet S in the main scanning direction indicated by the arrow B while the stimulable phosphor sheet S is being fed in the auxiliary scanning direction A. Upon exposure to the laser beam La, the stimulable phosphor sheet S emits light representing the recorded image, and the emitted light is guided to the photomultiplier 16 through the light guide 18. The photomultiplier 16 photoelectrically converts the light into an analog image signal, which is then applied to the logarithmic amplifier 20. An output image signal of the logarithmic amplifier 20 is converted into a digital image signal by the A/D converter 22 in response to a synchronizing signal (not shown), and the digital image signal, which represents digital image data, is stored in the memory 23.

The digital image data from the memory 23 are then processed for gradation and frequency conversion by the image processing apparatus 11. The processed digital image data are then fed to the D/A converter 26 of the image recording apparatus 12, by which the digital image data are converted back into an analog image signal. The analog image signal is applied to an analog input terminal of the multiplying D/A converter 28. At this time, a digital input terminal of the multiplying D/A converter 28 is supplied with the variation-correcting data from the multiplier data setting unit 27. Therefore, the analog image signal, which is representative of the continuous-tone image, is multiplied by the variation-correcting data by the multiplying D/A converter 28. The multiplied analog image signal is then applied to a modulation input terminal of the light modulator 32. In the light modulator 32, the analog image signal modulates the intensity of the laser beam Lc emitted from the laser oscillator tube 30. The modulated laser beam Lc from the light modulator 32 is deflected by the galvanometer mirror 34 which swings back and forth in the direction indicated by the arrow E. The deflected laser beam Lc scans the photographic film F in the main scanning direction indicated by the arrow B while the film F is being fed in the auxiliary scanning direction indicated by the arrow A. The image represented by the modulated laser beam Lb is now recorded on the film F which is two-dimensionally scanned by the laser beam Lb. The exposed film F is then sent to the automatic image developing machine in which the recorded image is reproduced as a visible image. The reproduced image is high in quality since it is free from undesired irregularities which would otherwise be caused by the various fluctuations and variations referred to above.

In the above embodiment, the D/A converter 26 has a 12-bit resolution. However, the resolution of the D/A converter 26 may range from 8 to 11 bits depending on the image signal or data to be supplied to the D/A converter 26.

In the illustrated embodiment, the digital variation-correcting data are supplied from the multiplier data setting unit 27 directly to the multiplying D/A converter 28. However, the digital variation-correcting data from the multiplier data setting unit 27 may be converted into analog data by a D/A converter, and then the analog image signal may be multiplied by the analog variation-correcting data by an analog multiplier instead of the multiplying D/A converter 28.

While the laser beam Lc emitted from the laser oscillator tube 30 is modulated with the image signal by the light modulator 32 in the illustrated embodiment, a semiconductor laser may be employed in place of the laser oscillator tube 30, and the emitted laser beam may directly be modulated with the analog image signal.

With the present invention, a continuous-tone image is reproduced and fluctuations are compensated for by respective independent devices (i.e., the D/A converter 26 and the multiplying D/A converter 28) in the image recording apparatus. Therefore, the D/A converter for reproducing the continuous-tone image may be of a lower resolution than if the continuous-tone image were reproduced and the fluctuations were compensated for by one device in the conventional system. Since such D/A converter has a shorter settling time and is relatively inexpensive, the time required to record an image is reduced, and the image recording apparatus is less costly to manufacture.

Although a certain preferred embodiment has been shown and described, it should be understood that many changes and modifications may be made therein without departing from the scope of the appended claims.

What is claimed is:

1. An image recording apparatus for recording an image on an image recording medium, comprising:
   a digital-to-analog converter for converting digital image data into analog image data, said digital-to-analog converter having a resolution corresponding to a predetermined range of image gradations;
   a multiplier for multiplying the analog image data provided by said digital-to-analog converter with a correction signal to compensate for variations in a recorded image due to film sensitivity characteristics, automatic developing machine characteristics, optical system transmittance characteristics, laser power fluctuations, and the like, to thereby generate an output signal; and
   means for controlling the density of gradiations of said image to be recorded based on said output signal from said multiplier.

2. An image recording apparatus according to claim 1, wherein the resolution of said digital-to-analog converter ranges from 8 to 12 bits.

3. An image recording apparatus according to claim 1 or 2, wherein said multiplier comprises a multiplying digital-to-analog converter and said signal for correcting for variations is represented by digital data.

4. An image recording apparatus according to claim 1, further comprising laser beam generating means for generating a laser beam, light modulating means for modulating the intensity of the laser beam with the output signal from said multiplier, a light deflector for deflecting the modulated laser beam to scan a photographic film with the deflected laser beam, and an image developing machine for developing the image which is recorded on said photographic film by said deflected laser beam.

5. An image recording apparatus according to claim 2, further comprising laser beam generating means for generating a laser beam, light modulating means for modulating the intensity of the laser beam with the output signal from said multiplier, a light deflector for deflecting the modulated laser beam to scan a photographic film with the deflected laser beam, and an image developing machine for developing the image which is recorded on said photograhpic film by said deflected laser beam.

6. An image recording apparatus according to claim 3, further comprising laser beam generating means for generating a laser beam, light modulating means for modulating the intensity of the laser beam with the output signal from said multiplier, a light deflector for deflecting the modulated laser beam to scan a photographic film with the deflected laser beam, and an image developing machine for developing the image which is recorded on said photographic film by said deflected laser beam.

* * * * *